(12) United States Patent  
DiRusso et al.

(10) Patent No.: US 11,500,394 B2  
(45) Date of Patent: *Nov. 15, 2022

(54) AIRPLANE CLIMB THRUST OPTIMIZATION

(71) Applicant: The Boeing Company, Chicago, IL (US)

(72) Inventors: Joseph M. DiRusso, Snohomish, WA (US); Keith D. Parsons, Renton, WA (US)

(73) Assignee: The Boeing Company, Chicago, IL (US)

( * ) Notice: Subject to any disclaimer, the term of this patent is extended or adjusted under 35 U.S.C. 154(b) by 448 days.

This patent is subject to a terminal disclaimer.

(21) Appl. No.: 16/845,656

(22) Filed: Apr. 10, 2020

(65) Prior Publication Data

US 2020/0257313 A1    Aug. 13, 2020

Related U.S. Application Data

(63) Continuation of application No. 15/789,161, filed on Oct. 20, 2017, now Pat. No. 10,671,092.

(51) Int. Cl.
    *G05D 1/06*     (2006.01)
    *G06Q 10/06*    (2012.01)
    *B64C 13/18*    (2006.01)
    *B64D 31/06*    (2006.01)

(52) U.S. Cl.
    CPC .......... *G05D 1/0661* (2013.01); *B64C 13/18* (2013.01); *B64D 31/06* (2013.01); *G06Q 10/06315* (2013.01)

(58) Field of Classification Search
    CPC ...... G05D 1/0661; B64C 13/18; B64D 31/06; G06Q 10/06315
    See application file for complete search history.

(56) References Cited

U.S. PATENT DOCUMENTS

| | | |
|---|---|---|
| 4,642,775 A | 2/1987 | Cline et al. |
| 5,299,765 A | 4/1994 | Blechen |
| 5,457,634 A | 10/1995 | Chakravarty |
| 8,380,371 B2 | 2/2013 | DeJonge |
| 8,670,881 B2 | 3/2014 | DeJonge |
| 9,174,745 B1 * | 11/2015 | Jimenez ................. G01C 23/00 |
| 9,564,056 B1 | 2/2017 | Ghaemi et al. |
| 2012/0158220 A1 | 6/2012 | Accardo |
| 2014/0018980 A1 | 1/2014 | Bollapragada et al. |
| 2015/0211859 A1 * | 7/2015 | Dacre-Wright ........ G05D 1/101 |
| | | 701/465 |

(Continued)

*Primary Examiner* — Donald J Wallace
(74) *Attorney, Agent, or Firm* — McDonnell Boehnen Hulbert & Berghoff LLP

(57) ABSTRACT

An example method includes: receiving information indicative of a desired aircraft cruise insertion point comprising achieving a desired cruise altitude for an aircraft within a predetermined period of time from departure, or within a predetermined distance from departure; determining a desired airspeed for the aircraft; prior to a flight of the aircraft, determining, based on the desired airspeed and the desired aircraft cruise insertion point, a climb trajectory for the aircraft; and during a climb flight phase of the aircraft, varying climb thrust of an engine of the aircraft to follow the climb trajectory and achieve the desired aircraft cruise insertion point.

17 Claims, 9 Drawing Sheets

(56) References Cited

U.S. PATENT DOCUMENTS

| | | |
|---|---|---|
| 2015/0362920 A1* | 12/2015 | McGregor .............. B64F 1/26 |
| | | 701/15 |
| 2016/0004255 A1 | 1/2016 | Moxon |
| 2017/0090482 A1 | 3/2017 | Zamit-Mangion et al. |
| 2018/0067500 A1 | 3/2018 | Kim et al. |
| 2018/0286254 A1 | 10/2018 | Westervelt et al. |
| 2019/0121369 A1 | 4/2019 | DiRusso et al. |
| 2019/0277637 A1 | 9/2019 | Ghaemi et al. |

* cited by examiner

208

MODIFYING THE PREDETERMINED AIRCRAFT CLIMB TRAJECTORY BASED ON THE INFORMATION INDICATIVE OF THE DESIRED AIRCRAFT CRUISE INSERTION POINT TO DETERMINE A MODIFIED AIRCRAFT CLIMB TRAJECTORY, WHERE VARYING THE CLIMB THRUST OF THE ENGINE COMPRISES VARYING THE CLIMB THRUST TO FOLLOW THE MODIFIED AIRCRAFT CLIMB TRAJECTORY AND ACHIEVE THE DESIRED AIRCRAFT CRUISE INSERTION POINT

MAINTAINING A RATE OF CLIMB OF THE AIRCRAFT BY SENDING A COMMAND TO AN ELEVATOR FLIGHT CONTROL SURFACE OF THE AIRCRAFT TO ADJUST A PITCH ANGLE OF THE AIRCRAFT DURING THE CLIMB FLIGHT PHASE, THEREBY MAINTAINING THE RATE OF CLIMB WHILE THE CLIMB THRUST IS VARIED

MONITORING VARIATION IN WEIGHT AND ALTITUDE OF THE AIRCRAFT DURING THE CLIMB FLIGHT PHASE

214

DETERMINING A MODIFIED AIRSPEED FOR THE AIRCRAFT BASED ON THE VARIATION, WHERE VARYING THE CLIMB THRUST OF THE ENGINE COMPRISES VARYING THE CLIMB THRUST TO ACHIEVE THE MODIFIED AIRSPEED

DETERMINING A TEMPERATURE AT A PARTICULAR TURBINE STAGE WITHIN THE ENGINE, WHERE VARYING THE CLIMB THRUST OF THE ENGINE COMPRISES ADJUSTING THE CLIMB THRUST TO: (I) PRECLUDE THE TEMPERATURE FROM BEING WITHIN A PREDETERMINED TEMPERATURE RANGE, OR (II) PRECLUDE THE ENGINE FROM OPERATING WITHIN THE PREDETERMINED TEMPERATURE RANGE FOR A PERIOD OF TIME EXCEEDING A PREDETERMINED PERIOD OF TIME

DURING THE CLIMB FLIGHT PHASE OF THE AIRCRAFT, VARYING AT LEAST ONE OF: (I) AIRSPEED OF THE AIRCRAFT, (II) THE CLIMB THRUST OF THE ENGINE, AND (III) RATE OF CLIMB OF THE AIRCRAFT BASED ON THE COST INFORMATION AND THE ENGINE MAINTENANCE COST INFORMATION

FIG. 16

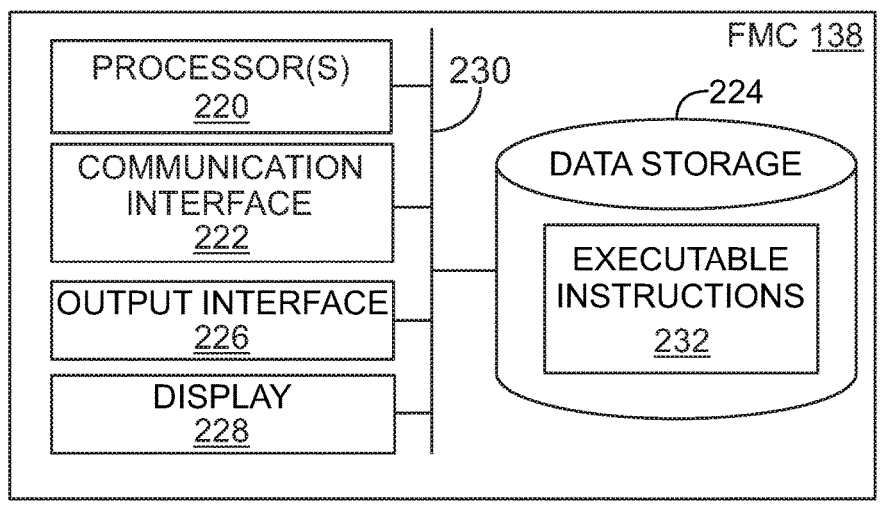

FIG. 17

AIRPLANE CLIMB THRUST OPTIMIZATION

CROSS REFERENCE TO RELATED APPLICATION

The present application is a continuation of U.S. patent application Ser. No. 15/789,161, filed on Oct. 20, 2017, the entire contents of which are herein incorporated by reference as if fully set forth in this description.

FIELD

The present disclosure relates generally to airplane climb thrust optimization. More particularly the present disclosure relates to varying climb thrust during a climb flight phase of an aircraft to reduce maintenance cost of an aircraft engine, reduce fuel consumption, and reduce flight time.

BACKGROUND

In examples, aircraft are designed to meet performance targets at maximum takeoff weight including takeoff field length and climb time or climb distance to a desired aircraft cruise altitude. Operation at less than maximum takeoff weight allows for a reduction of both takeoff and climb thrust from maximum ratings. Reducing takeoff and/or climb thrust from maximum ratings may be beneficial to engine life.

Time between engine refurbishments and cost of refurbishment are directly related to how an engine is operated. The key drivers are stage length, engine cycles per year, and how hard the engine is used, i.e., shaft speeds and core temperatures during takeoff and climb flight phases in addition to adverse environmental factors.

Reducing engine thrust during takeoff and climb flight phases may reduce engine core temperatures. In examples, the highest core temperature measured in an engine is turbine gas temperature, which may be measured by thermocouples or other temperature sensors in the low pressure turbine nozzle guide vanes. High pressure turbine blades achieve some of the highest temperatures in an engine and consequently are typically damaged by oxidation/burning and erosion. Allowing for reduced thrust during takeoff and climb flight phases reduces turbine gas temperature, thus reducing engine damage and extending engine life.

It is with respect to these and other considerations that the disclosure made herein is presented.

SUMMARY

The present disclosure describes examples that relate to airplane climb thrust optimization.

In one aspect, the present disclosure describes a method. The method includes: (i) receiving, at a flight management computer, information indicative of a desired aircraft cruise insertion point comprising achieving a desired cruise altitude for an aircraft within: a predetermined period of time from departure, or within a predetermined distance from departure; (ii) determining, by the flight management computer, a desired airspeed for the aircraft; (iii) prior to a flight of the aircraft, determining by the flight management computer, based on the desired airspeed and the desired aircraft cruise insertion point, a climb trajectory for the aircraft; and (iv) during a climb flight phase of the aircraft, varying, by the flight management computer, climb thrust of an engine of the aircraft to follow the climb trajectory and achieve the desired aircraft cruise insertion point.

In another aspect, the present disclosure describes a non-transitory computer readable medium having stored therein instructions that, in response to execution by a flight management computer, cause the flight management computer to perform operations. The operations include: (i) receiving information indicative of a desired aircraft cruise insertion point comprising achieving a desired cruise altitude for an aircraft within a predetermined period of time from departure, or within a predetermined distance from departure; (ii) determining a desired airspeed for the aircraft; (iii) prior to a flight of the aircraft, determining, based on the desired airspeed and the desired aircraft cruise insertion point, a climb trajectory for the aircraft; and (iv) during a climb flight phase of the aircraft, varying climb thrust of an engine of the aircraft to follow the climb trajectory and achieve the desired aircraft cruise insertion point.

In still another aspect, the present disclosure describes a flight management computer including one or more processors; and data storage storing thereon instructions, that when executed by the one or more processors, cause the flight management computer to perform operations. The operations include: (i) receiving information indicative of a desired aircraft cruise insertion point comprising achieving a desired cruise altitude for an aircraft within a predetermined period of time from departure, or within a predetermined distance from departure; (ii) determining a desired airspeed for the aircraft; (iii) prior to a flight of the aircraft, determining, based on the desired airspeed and the desired aircraft cruise insertion point, a climb trajectory for the aircraft; and (iv) during a climb flight phase of the aircraft, varying climb thrust of an engine of the aircraft to follow the climb trajectory and achieve the desired aircraft cruise insertion point.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

FIG. 12 is a flowchart of additional operations that may be executed and performed with the method of FIG. 11, in accordance with an example implementation.

FIG. 13 is a flowchart of additional operations that may be executed and performed with the method of FIG. 11, in accordance with an example implementation.

FIG. 14 is a flowchart of additional operations that may be executed and performed with the method of FIG. 11, in accordance with an example implementation.

FIG. 15 is a flowchart of additional operations that may be executed and performed with the method of FIG. 11, in accordance with an example implementation.

FIG. 16 is a flowchart of additional operations that may be executed and performed with the method of FIG. 11, in accordance with an example implementation.

FIG. 17 is a block diagram of an example flight management computer of an aircraft, according to an example implementation.

DETAILED DESCRIPTION

Generally, an aircraft that is fully loaded and thus has maximum takeoff weight (MTOW), may take a longer time and distance to reach a target cruising altitude compared to a lighter aircraft. As an example, an aircraft at MTOW may take about 25 minutes and a ground distance of 150 nautical miles (nm) to climb to a cruising altitude of 31,000 feet (ft). However, if the aircraft has a smaller takeoff weight (TOW) the aircraft may take about 20 minutes and a ground distance of 121 nm to reach an even higher cruise altitude of 35,000 ft.

Similarly, an aircraft that is fully loaded and thus has MTOW, may have a smaller rate of climb (RoC) compared to a lighter aircraft. In examples, the RoC of an aircraft can be defined as a vertical speed of an aircraft, or in other words the rate of positive altitude change with respect to time or distance. The RoC may be in feet per minute (ft/min) or meter per second (m/s). The RoC of an aircraft may be indicated with a vertical speed indicator (VSI) or instantaneous vertical speed indicator (IVSI).

Figure 1:
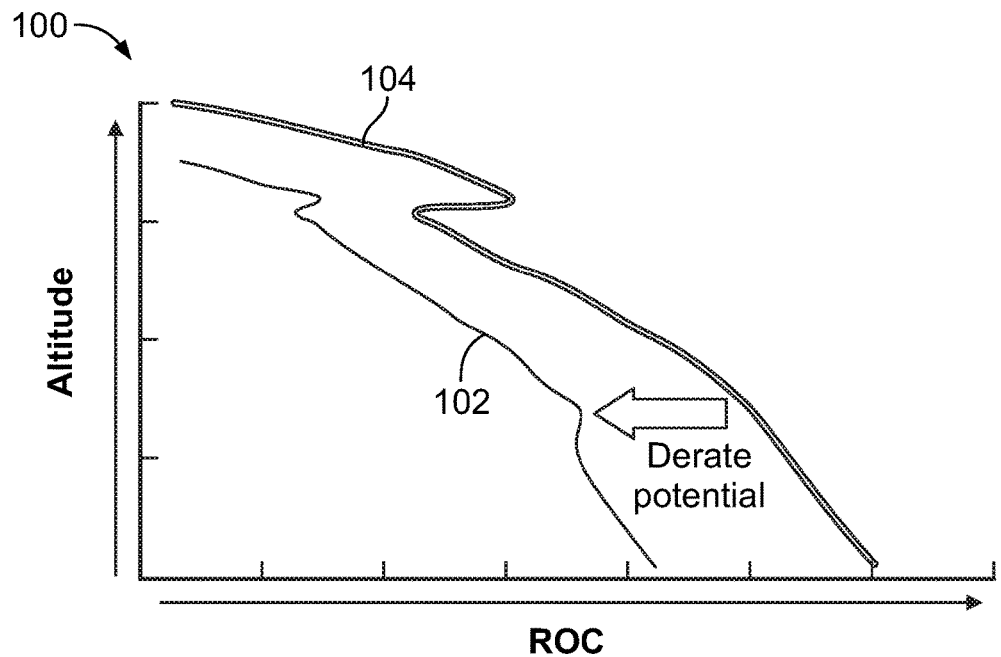
FIG. 1 illustrates rate of climb of an aircraft having maximum takeoff weight compared to a rate of climb of the aircraft at less than maximum takeoff weight, in accordance with an example implementation.

FIG. 1 illustrates RoC of an aircraft having MTOW compared to a RoC of the aircraft at less than MTOW, in accordance with an example implementation. Specifically, FIG. 1 depicts a plot 100 having a first line 102 tracing the RoC of the aircraft at MTOW as the aircraft's altitude increases while the aircraft is using maximum climb thrust. A second line 104 traces the RoC of the aircraft at less than MTOW as the aircraft's altitude increases while the aircraft is using maximum climb thrust. The x-axis of the plot 100 indicates the RoC, whereas the y-axis indicates altitude of the aircraft.

As depicted in FIG. 1, the RoC of the aircraft at MTOW is less than the respective RoC of the aircraft at less than MTOW at a given altitude. Thus, an operator of the aircraft expects and accepts that at when the aircraft is operating at MTOW, the climb time, climb distance, and RoC are lower than the respective climb time, climb distance, and RoC for the aircraft at less than MTOW. Therefore, the operator of the aircraft may accept derating climb thrust of the aircraft at less than MTOW. Derating the climb thrust may increase the time that the aircraft takes to get to a desired altitude; however engine temperatures may be reduced, leading to an increased engine life and reduced engine maintenance cost. Thus, derating the climb thrust to a level that would cause an acceptable increase in the time that the aircraft takes to get to the desired altitude may be desirable.

In an example implementation, an operator of an aircraft may be given an option to derate climb thrust to particular values less than maximum climb thrust. For instance, assuming that maximum climb thrust is CLB, then the operator may select a first derated climb thrust CLB1 that is 10% lower than CLB or select a second derated climb thrust CLB2 that is 20% less than CLB. The derated climb thrust may reduce the RoC of the aircraft but may increase the life of the engine.

Further, in examples, the operator may be given options to taper the derated climb thrust CLB1 or CLB2 back to CLB to restore the maximum RoC possible for a given aircraft takeoff weight. For instance, the operator may have a first option to taper the climb thrust over a small altitude range such as between an altitude of 10,000 and an altitude of 12,000 ft. The first option may be referred to as a quick taper as the tapering occurs over a small altitude range. The operator may also have a second option to taper the climb thrust over a larger altitude range such as between an altitude of 10,000 and an altitude of 30,000 ft. The second option may be referred to as a slow taper as the tapering occurs over a large altitude range. In other examples, the operator may be given more tapering altitude range options such as between an altitude of 25,000 and an altitude of 35,000 ft, an altitude of 25,000 and an altitude of 40,000 ft, an altitude of 30,000 and an altitude of 40,000 ft, among other possible ranges.

Figure 2:
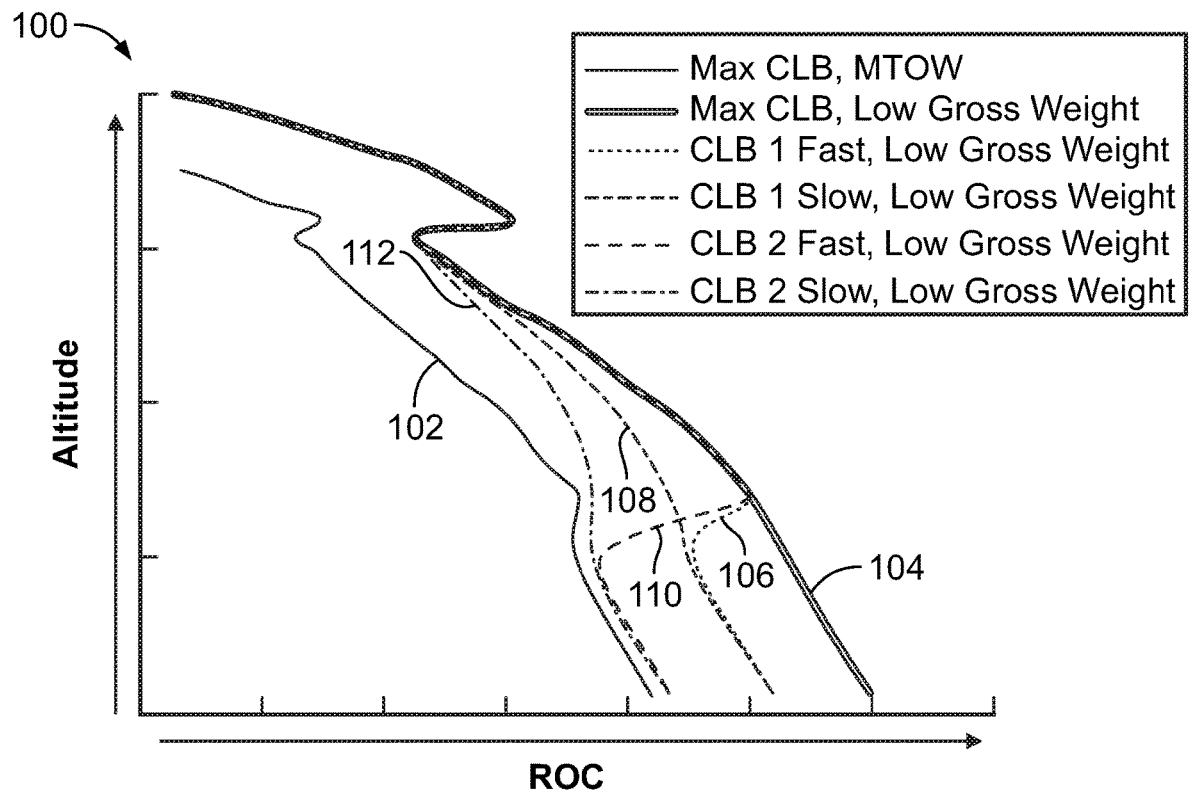
FIG. 2 illustrates rate of climb of an aircraft using derated thrust levels and tapering back to a full rated climb thrust level, in accordance with an example implementation.

FIG. 2 illustrates RoC of an aircraft using derated thrust levels and tapering back to a full rated climb thrust level, in accordance with an example implementation. FIG. 2 depicts the lines 102 and 104 in addition to lines representing different climb thrust tapering options.

Particularly, line 106 represents using CLB1 (e.g., 10% climb thrust derate) and a quick tapering option (e.g., tapering over altitude range 10,000 ft-12,000 ft). Line 108 represents using CLB1 and a slow tapering option (e.g., tapering over altitude range 10,000 ft-30,000 ft). Line 110 represents using CLB2 (e.g., 20% climb thrust derate) and a quick tapering option (e.g., tapering over altitude range 10,000 ft-12,000 ft). Line 112 represents using CLB2 and a slow tapering option (e.g., tapering over altitude range 10,000 ft-30,000 ft).

As shown in FIG. 2, by using climb thrust derates CLB1 and CLB2, RoC is reduced at low altitudes, but due to tapering, high altitude RoC is not affected by climb thrust derate. Particularly, below 10,000 ft, climb thrust derates CLB1 and CLB2 offer better climb performance (e.g., higher RoC) than a fully rated thrust CLB at MTOW represented by the line 102. Also, above 30,000 ft, climb thrust derates CLB1 and CLB2 provide substantially the same RoC as the fully rated thrust CLB at a reduce takeoff weight as indicated by the lines 108 and 112 merging with the line 104.

In examples, using climb thrust derates CLB1 and CLB2 and the different tapering options may increase the time and distance that the aircraft takes to reach a desired altitude and may also increase fuel consumption. For example, when using that maximum climb thrust CLB the aircraft may take about 20 minutes to reach a desired altitude; however, when using CLB2 with a slow tapering option, the aircraft may take 23.5 minutes to reach the desired altitude. Using CLB 1 and/or other tapering options may lead to times that are greater than 20 minutes but less than 23.5 minutes.

Also, in an example, when using that maximum climb thrust CLB the aircraft may traverse about 125 nm to reach a desired altitude; however, when using CLB2 with a slow tapering option, the aircraft may fly about 145 nm to reach the desired altitude. Using CLB1 and/or other tapering options may lead to distances that are greater than 125 nm but less than 145 nm. Further, in this example, when using that maximum climb thrust CLB the aircraft may consume about 11300 lb of fuel to reach a desired altitude; however, when using CLB2 with a slow tapering options, the aircraft may consume about 12100 lb of fuel to reach the desired altitude. Using CLB1 and/or other tapering options may lead to fuel amounts that are greater than 11300 lb of fuel but less than 12100 lb of fuel.

Thus, using climb thrust derates CLB1 and CLB2 may lead to an increase the climb time, distance, and in fuel consumption to reach a desired altitude. However, the cruise distance is reduced, and therefore less cruise fuel is used and the increase in time for the overall mission or trip is minimal.

Figure 3:
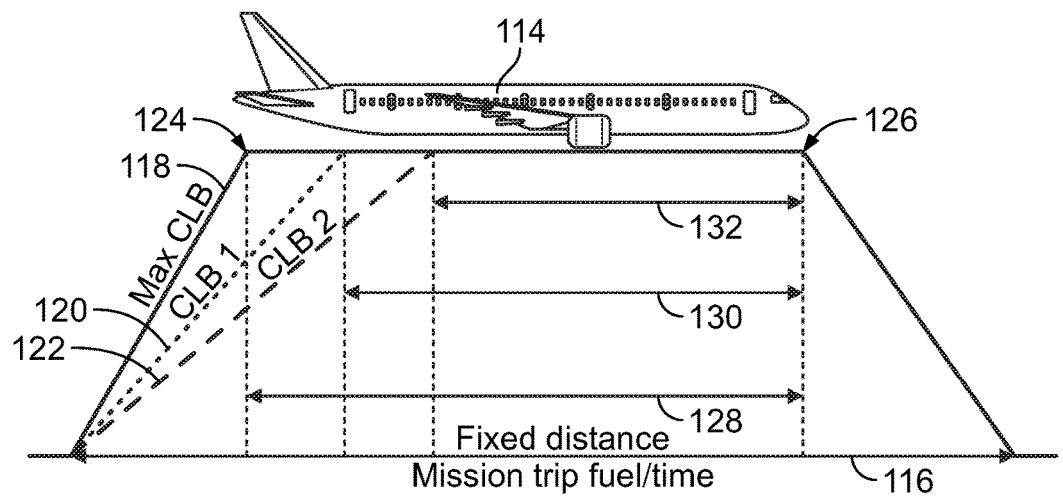
FIG. 3 illustrates effect of using climb thrust derates on overall mission of an aircraft, in accordance with an example implementation.

FIG. 3 illustrates effect of using climb thrust derates CLB1 and CLB2 on overall mission of an aircraft 114, in accordance with an example implementation. As depicted in FIG. 3, the mission distance, fuel, and time are represented by line 116. The mission distance is fixed, whereas the mission fuel and time may vary.

Line 118 represents climb profile of the aircraft 114 while using maximum climb thrust CLB, line 120 represents climb profile of the aircraft 114 while using climb thrust derate CLB1, and line 122 represents climb profile of the aircraft 114 while using climb thrust derate CLB2. Lengths of the lines 118, 120, and 122 represent distance traversed by the aircraft 114 to reach a desired altitude at point 124, whereas projection of the lines 118, 120, and 122 on the line 116 represented time taken by the aircraft 114 to reach the desired altitude when a respective climb profile and climb thrust level is used.

Cruising distance and time from reaching the desired altitude and beginning descent at point 126 is represented by arrows 128, 130, and 132. Specifically, the arrow 128 represents cruise distance and time when using maximum climb thrust CLB, the arrow 130 represents cruise distance and time when using climb thrust derate CLB1, and the arrow 132 represents cruise distance and time when using climb thrust derate CLB2.

As shown by a comparison of lengths of the lines 118, 120, and 122, using CLB2 leads to an increase in distance and time to reach the point 124 compared to using CLB1 or CLB. However, as shown by a comparison of lengths of the arrows 128, 130, and 132, using CLB2 leads to a decrease in the cruising distance and time taken by the aircraft 114 to begin its descent at the point 126 compared to using CLB1 or CLB. As such, fuel and time used while cruising is less for CLB2 compared to CLB1 and is less for CLB1 compared to CLB.

Thus, in examples, when accounting for the fuel and time that the aircraft 114 spends at cruising altitude (after reaching the point 124), the overall fuel and time differences may be small. As an example for illustration, the difference in time may be on the order of minutes and could be less than a minute, whereas the difference in fuel may be less than 150 lb and the difference in fuel cost may be less than $30.

As indicated by these numbers, the differences for the overall mission are small. However, using derated climb thrusts may lead a reduction in Turbine Gas Temperature (TGT) of the engine and a reduction in time spent at TGT. Reduced TGT and reduction in the time-at-TGT (the duration of time that the engine operates at TGT) may reduce engine damage and extend engine life. Thus, the benefit to the engine life and reduction in maintenance cost over the life of the engine may be sufficiently large to justify using derated climb thrusts (e.g., CLB1 and CLB2).

Figure 4:
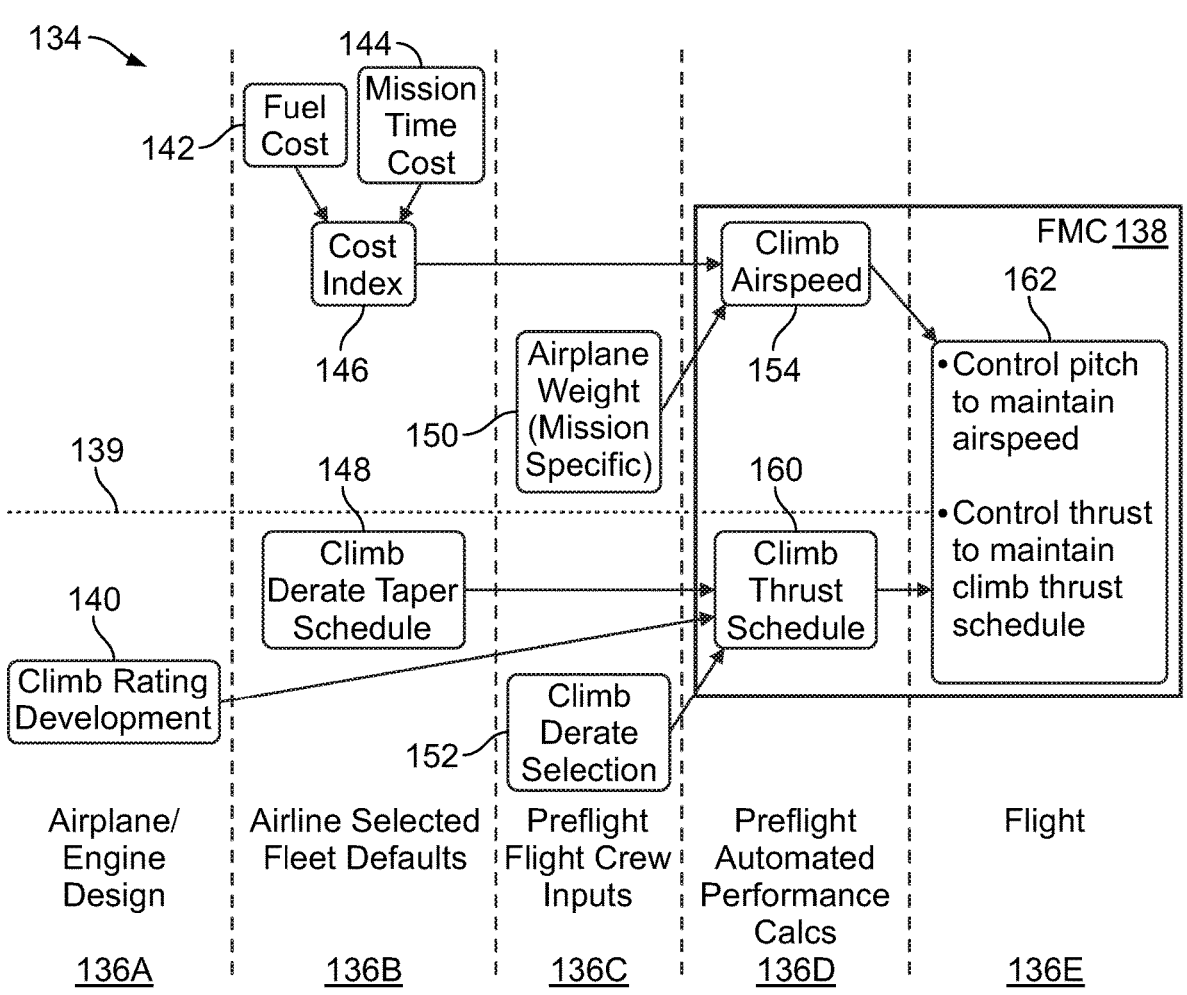
FIG. 4 illustrates a block diagram depicting operations associated with determining a climb profile of an aircraft, in accordance with an example implementation.

FIG. 4 illustrates a block diagram 134 depicting operations associated with determining a climb profile of an aircraft, in accordance with an example implementation. The block diagram 134 is divided into five columns 136A, 136B, 136C, 136D, and 136E, where each column represent a phase during which blocks included in the column could be executed, performed, or implemented.

Specifically, the column 136A is associated with operations that could take place during airplane and engine design. The column 136B is associated with operations that could be performed and parameters that could be selected by an airline to be implemented as a default for a fleet of aircraft, for example. The column 136C is associated with information that could be input by a crew of an aircraft or a dispatch department of airline prior to the flight. The column 136D is associated with preflight operations and calculations that could be performed by a flight management computer (FMC) 138 of the aircraft. The column 136E is associated with preflight operations performed by the FMC 138 during flight of the aircraft.

The FMC 138 of the aircraft may be coupled to the aircraft and may include computing devices, processors, data storage, memories, etc., and may be in communication with various systems and subsystems of the aircraft. For instance, the FMC 138 may be in communication with various sensors, navigation module, trajectory management module, communication devices, guidance module, etc. of the aircraft. The FMC 138 may be configured to issue thrust and altitude commands in a closed-loop feedback control manner to guide the aircraft to accomplish particular flight objectives. An example configuration of the FMC 138 is shown in FIG. 17 and described below with respect to FIG. 17.

The block diagram 134 is further divided by dashed line 139 with blocks above the dashed line 139 representing operations related to the aircraft, whereas blocks below the dashed line 139 represent operations related to the engine of the aircraft.

At block 140, an aircraft and/or engine manufacturer develop climb rating for the aircraft. At the block 140, the engine performance characteristics such as maximum thrust, safe operating temperature for the various compressor and turbine stages of the engine, fuel consumption rate, maximum safe takeoff thrust, and maximum safe climb thrust may also be determined. In examples, a turbine of an engine of the aircraft may include a set of static guide vanes or nozzle vanes that accelerates and adds swirl to the fluid and directs it to the next row of turbine blades mounted on a turbine rotor. Each row of turbine blades may be referred to as a stage of the turbine. For example, the turbine may include a high pressure turbine stage and a low pressure turbine stage where TGT is measured. As such, in examples, at block 140, the aircraft and/or engine manufacturer may develop the climb rating for the aircraft based on a safe operating temperature within a particular stage of the turbine stages.

The airline may then determine a balance between fuel cost at block 142 and mission time cost at block 144 to select a cost index line at block 146. Different cost index lines represent a particular balance or weight given to the cost of fuel consumed in a mission against a weight given to the time that the aircraft takes to complete the mission. For instance, the aircraft can fly at a relatively low speed to save fuel; however, the aircraft would take a long time to reach its destination. Conversely, the aircraft can fly at a relatively high speed to arrive at its destination in a short amount of time; however, fuel cost would increase. Each cost index line represents a particular balance or weights given to fuel cost and mission time. The cost index line is used by the FMC 138 to determine a climb velocity or airspeed for the aircraft as described below with respect to FIG. 5.

On the engine side, below the dashed line 139, within the column 136B, at block 148, the airline may select the climb thrust derate taper schedule, e.g., select either quick taper schedule or slow taper schedule. In other words, as described above with respect to FIG. 2, the airline may preconfigure the aircraft and the engine such that the aircraft applies a particular climb thrust taper schedule that represents an altitude range during which the aircraft restores operating at maximum climb thrust CLB from operating at a particular climb thrust derate (CLB1 or CLB2). The climb thrust taper schedule could be slow (e.g., occurring over an altitude range 10,000 ft to 30,000 ft) or quick (e.g., occurring over an altitude range 10,000 ft to 12,000 ft) to.

Within the column 136C, above the dashed line 139, at block 150, aircraft crew (e.g., pilot, copilot, or airline dispatch department) may enter mission specific information to the FMC 138. The mission specific information may include, for example, an estimated weight of aircraft at the top of climb (e.g., upon the aircraft finishing the climb flight phase and reaching cruising altitude). The estimated weight of the aircraft at the top of climb may be based on several factors including the number of passengers, the amount of fuel that the aircraft is expected to carry based on how far the destination of the aircraft is, etc.

On the engine side below the dashed line 139, at block 152 the aircraft crew may select the climb thrust derate value. For example, the FMC 138 may generate a display of a graphical user interface in the cockpit showing climb thrust derate options such as CLB1 (10% derating) and CLB2 (20% derating), and the aircraft crew may select (e.g., via a button or touching a user-interface item on the graphical user interface) either CLB1 or CLB2 or other available options.

Within the column 136D, above the dashed line 139, at block 154 the FMC 138 determines desired climb airspeed for the aircraft. Airspeed is the speed of the aircraft relative to the air. The airspeed could be represented by indicated airspeed ("IAS"), calibrated airspeed ("CAS"), equivalent airspeed ("EAS"), true airspeed ("TAS"), and density airspeed.

Indicated airspeed may be read off an airspeed gauge connected to a pitot static system. Calibrated airspeed may be indicated airspeed adjusted for pitot system position and installation error. Equivalent airspeed is calibrated airspeed adjusted for compressibility effects. True airspeed is equivalent airspeed adjusted for air density, and is also the speed of the aircraft through the air in which it is flying. In examples, calibrated airspeed may be within a few knots of indicated airspeed, while equivalent airspeed decreases slightly from calibrated airspeed as aircraft altitude increases or at high speeds. With EAS being constant, true airspeed increases as aircraft altitude increases as air density decreases with higher altitude.

Figure 5:
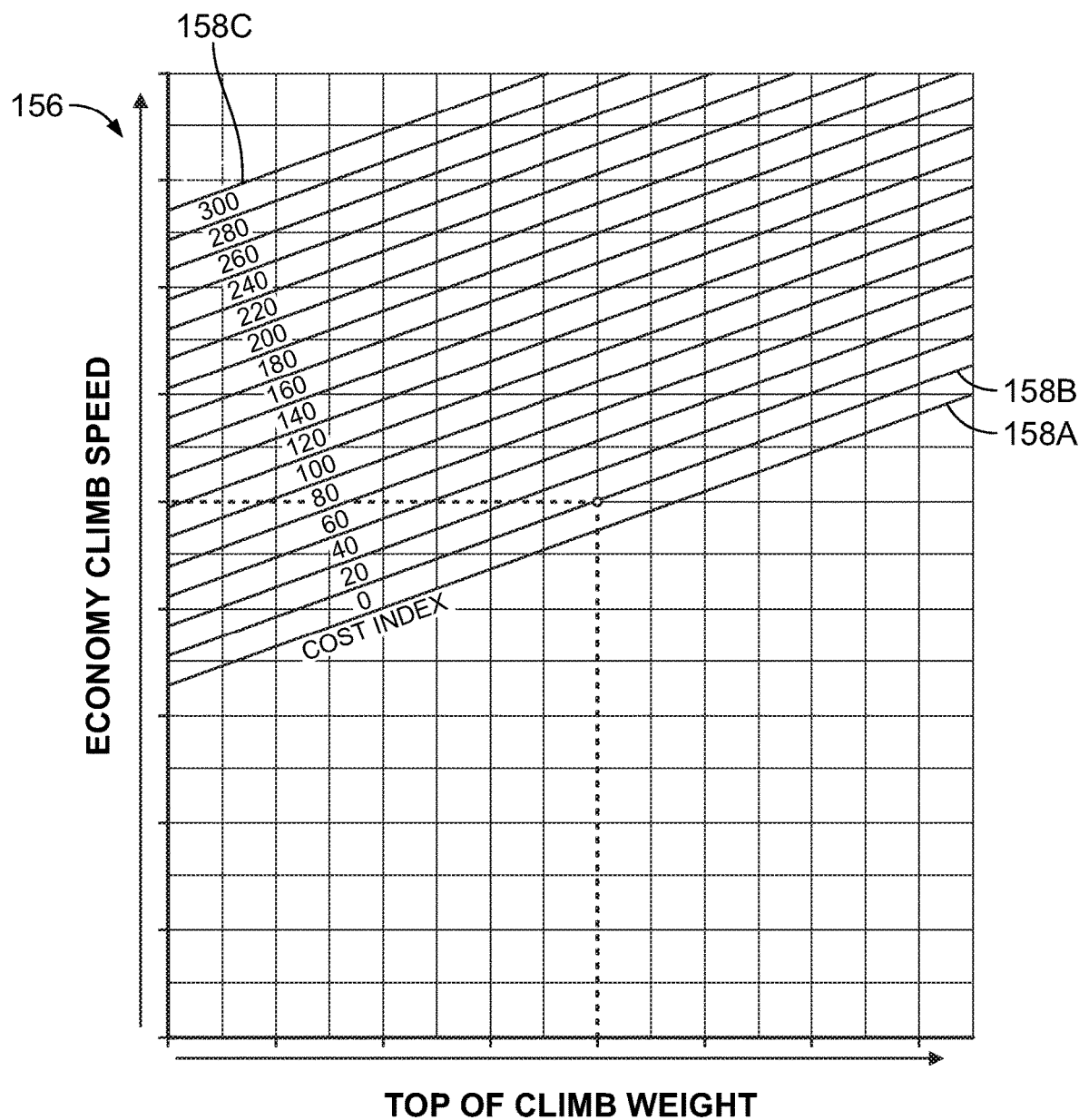
FIG. 5 illustrates determination of a desired airspeed for the aircraft, in accordance with an example implementation.

The FMC 138 may use inputs from the crew such as the estimated top of climb weight of the aircraft (from the block 150) and the airline selected cost index line (from the block 146) to determine the desired airspeed for the aircraft. FIG. 5 illustrates determination of a desired airspeed for the aircraft, in accordance with an example implementation. FIG. 5 illustrates a plot 156 having top of climb weight on the x-axis and desired climb calibrated airspeed on the y-axis. The plot 156 further depicts several cost index lines such as lines 158A, 158B, and 158C among several other illustrated lines.

Each of the cost index lines represent a tradeoff between fuel cost and mission time (time to destination). For instance, cost index line 158A labelled "0" gives priority to fuel consumption while not taking into consideration mission time. The cost index lines are ascendingly labelled in increments of "20" up to "320." For instance, the cost index line 158B is labelled "20" and the cost index line 158C is labelled "320." The ascendingly labelled cost index lines shift weight and priority gradually to mission time, indicated by a higher desired airspeed, while sacrificing fuel efficiency or fuel cost.

The airline may select the cost index line at the block 146 as described above based on preferences and priorities of the airline. For example, the airline may choose the cost index line 158B (labelled "20"). Given the input information to the FMC 138 indicating the top of climb weight on the x-axis, the FMC 138 determines the desired airspeed based on the selected cost index line 158B. The desired airspeed may be allowed to vary with altitude as the air density decreases, and thus the desired airspeed is constrained by the cost index line, the estimated top of claim weight of the aircraft, and the altitude of the aircraft. The cost index lines are configured (e.g., the slope of the cost index lines is selected) such that the desired airspeed increases the lift force over the drag force to obtain enhanced aircraft performance Referring back to FIG. 4, at block 160, the FMC 138 determines the climb thrust schedule. Specifically, the FMC 138 has or receives information indicating the maximum climb thrust of the engine (the block 140), the climb thrust derate taper schedule (the block 148), and the climb thrust derate selection (e.g., CLB1 or CLB2 at the block 152) and accordingly determines climb thrust schedule.

As an example, for illustration, assuming the maximum thrust is $T_{max}$ and climb thrust derate is CLB1 (10%), then the initial climb thrust level is ($T_{max}-0.1\ T_{max}$), which is equal to $0.9\ T_{max}$. Based on the taper schedule (e.g., quick or slow taper), the climb thrust level may be increased over a particular altitude range. For instance, the climb thrust level may be increased from $0.9T_{max}$ to $T_{max}$ over an altitude range of 10,000 ft to 30,000 ft. As such, the climb thrust schedule may, for example, be represented as an equation, a table, or a mapping indicating the desired climb thrust level of the engine versus altitude. This way, as the FMC 138 receives from aircraft altitude sensor information indicating an altitude of the aircraft, the FMC 138 accordingly determines the corresponding desired climb thrust level based on the climb thrust schedule.

At block 162, the FMC 138 sends a command to control the elevators (control surfaces) of the aircraft to control the pitch angle of the aircraft and maintain the desired airspeed determined at the block 154, and sends a command to control engine throttle to maintain climb thrust level according to the climb thrust schedule determined at the block 160. For instance, the FMC 138 may be in communication with a guidance module and a navigation module of the aircraft. The guidance module may use the generated airspeed and thrust commands in addition to position, velocity, and wind measurements for the aircraft received from the navigation module to generate airspeed and thrust commands. The guidance module may then communicate the airspeed and thrust commands to an automatic flight control system (AFCS), which in turn controls engine thrust and aerodynamic control surfaces of the aircraft in order to achieve the commands of the guidance module. The FMC 138 may implement a closed-loop feedback control on the airspeed and climb thrust level to maintain the actual airspeed and climb thrust level within a threshold error value from the desired airspeed and climb thrust level.

Figure 6:
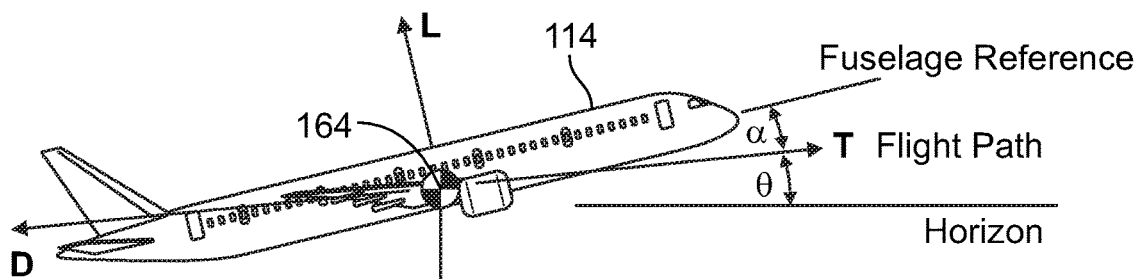
FIG. 6 illustrates forces acting on an aircraft, in accordance with an example implementation.

FIG. 6 illustrates forces acting on the aircraft 114, in accordance with an example implementation. As depicted in FIG. 6, weight (W) of the aircraft 114 acts downward at its center of gravity 164, Lift (L) acts perpendicular to a longitudinal plane or fuselage reference plane of the aircraft 114, thrust (T) acts in direction of flight path at an angle θ to horizon, and drag (D) acts in a direction opposite to the direction of thrust and flight path. Fuselage reference plane is at an angle α from the flight path or an angle (θ+α) from the horizon.

The operations described with respect to the block diagram 134 of FIG. 4 entail the FMC 138 constraining the climb thrust level to a predetermined climb thrust schedule (the block 160) and constraining the airspeed based on estimated top of climb aircraft weight, cost index line, and altitude. However, the RoC of the aircraft 114 is unconstrained and the FMC 138 continually adjusts the flight path angle of climb θ to maintain the desired airspeed and thrust level.

While the implementation shown and described with respect to FIG. 4 allows for achieving desired engine thrust level and airspeed, the cruise insertion point could vary. The cruise insertion point is a point at which the aircraft reaches a desired cruise altitude. The point can be defined by a distance from a departure point that the aircraft takes to reach the desired cruise altitude or a period of time since departure that the aircraft takes to reach the desired cruise altitude.

Figure 7:
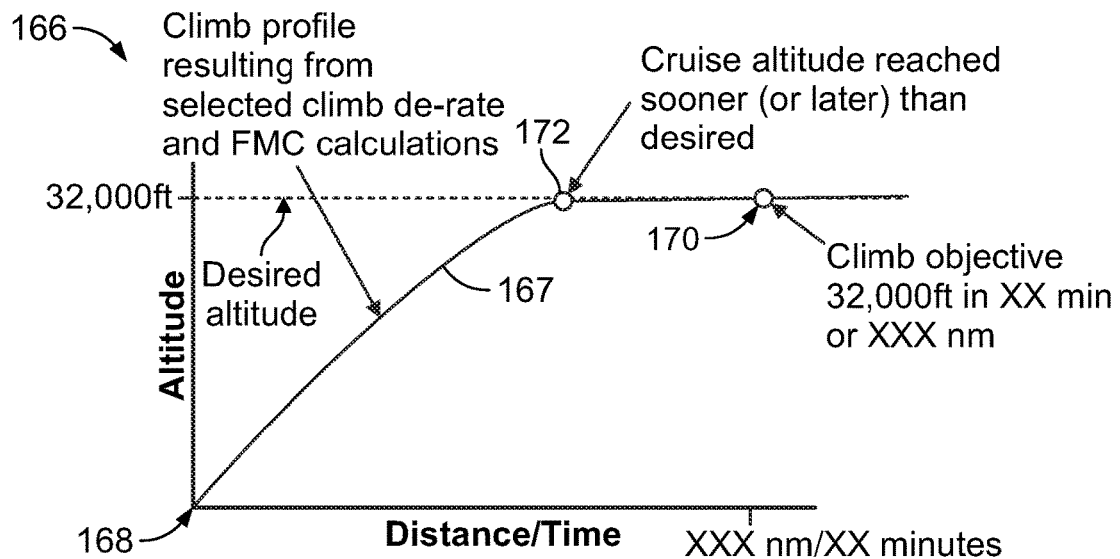
FIG. 7 illustrates a plot of a climb trajectory of an aircraft while implementing the operations of FIG. 4, in accordance with an example implementation.

FIG. 7 illustrates a plot 166 of a climb trajectory 167 of an aircraft while implementing the operations of FIG. 4, in accordance with an example implementation. The y-axis indicates altitude of the aircraft in ft, whereas the x-axis indicates distance from departure point 168 or time since leaving the departure point 168.

In examples, the Air Traffic Controller (ATC) sets a desired aircraft cruise insertion point 170 indicated by a particular cruise altitude (e.g., 32,000 ft as depicted in FIG. 7) that the aircraft ascends to within a predetermined distance or time from the departure airport (the point 168). Other factors may also affect the desired aircraft cruise insertion point 170 such as aircraft capability, airliner rules, and rules of the airport from which the aircraft is leaving.

The operations described with respect to FIG. 4 might not take into account the desired aircraft cruise insertion point 170. In other words, achieving the desired aircraft cruise insertion point 170 might not be set as an objective that the FMC 138 commands the aircraft to achieve. Rather, as described above, the FMC 138 constrains the climb thrust level and the airspeed, and adjusts the RoC of the aircraft to maintain the climb thrust level and the airspeed. As a result, the aircraft might reach the desired altitude at an actual aircraft cruise insertion point 172 that is different from the desired aircraft cruise insertion point 170 as shown in FIG. 7.

In some examples, as depicted in FIG. 7, the actual aircraft cruise insertion point 172 may be reached before the desired aircraft cruise insertion point 170, e.g., the desired altitude may be reached earlier or in a shorter distance than set by the ATC rules. This case indicates that the engines of the aircraft may have been overexerted or that a higher climb thrust level has been used by the aircraft to reach the actual aircraft cruise insertion point 172, without an economic or performance benefit as the desired aircraft cruise insertion point 170 would have been satisfactory. The FMC 138 could have derated the climb thrust level to reach the desired cruise altitude of 32,000 within the desired distance or time as set by the desired aircraft cruise insertion point 170. Such performance would have been acceptable, while protecting the engine from a high climb thrust level that indicates a higher engine core temperature and spending more time at the higher engine core temperature. Therefore, it may be desirable to take the desired aircraft cruise insertion point 170 into account to improve engine life and its maintenance cost over a life of the engine.

Additionally, the implementation of FIG. 4 allows the climb thrust level to return to a fully rate climb thrust level (CLB) at a particular altitude rather than adhering to the line 102 shown in FIGS. 1-2. Further enhancements in engine life and reduction in maintenance cost could be achieved by allowing the RoC of the aircraft to adhere to the line 102 shown in FIGS. 1 and 2. As described above, derating the climb thrust (i.e., using CLB1 and CLB2) could be phased out over a particular altitude range as represented by the lines 106, 108, 110, and 112 in FIG. 2. Such phasing out of derating the climb thrust allows the aircraft to restore operating at maximum climb thrust to reduce the time and distance that the aircraft take to reach the desired altitude. However, causing the aircraft to adhere closer to the line 102 may achieve further reduction in TGT and time-at-TGT while achieving the desired aircraft cruise insertion point 170. Operating according to the line 102 rather than tapering or phasing out climb thrust derating may cause an increase in fuel consumption and time and distance to reach the desired altitude; however, any such increase may be outweighed by the increase in engine life and reduction in engine maintenance cost over a life of the engine.

Figure 8:
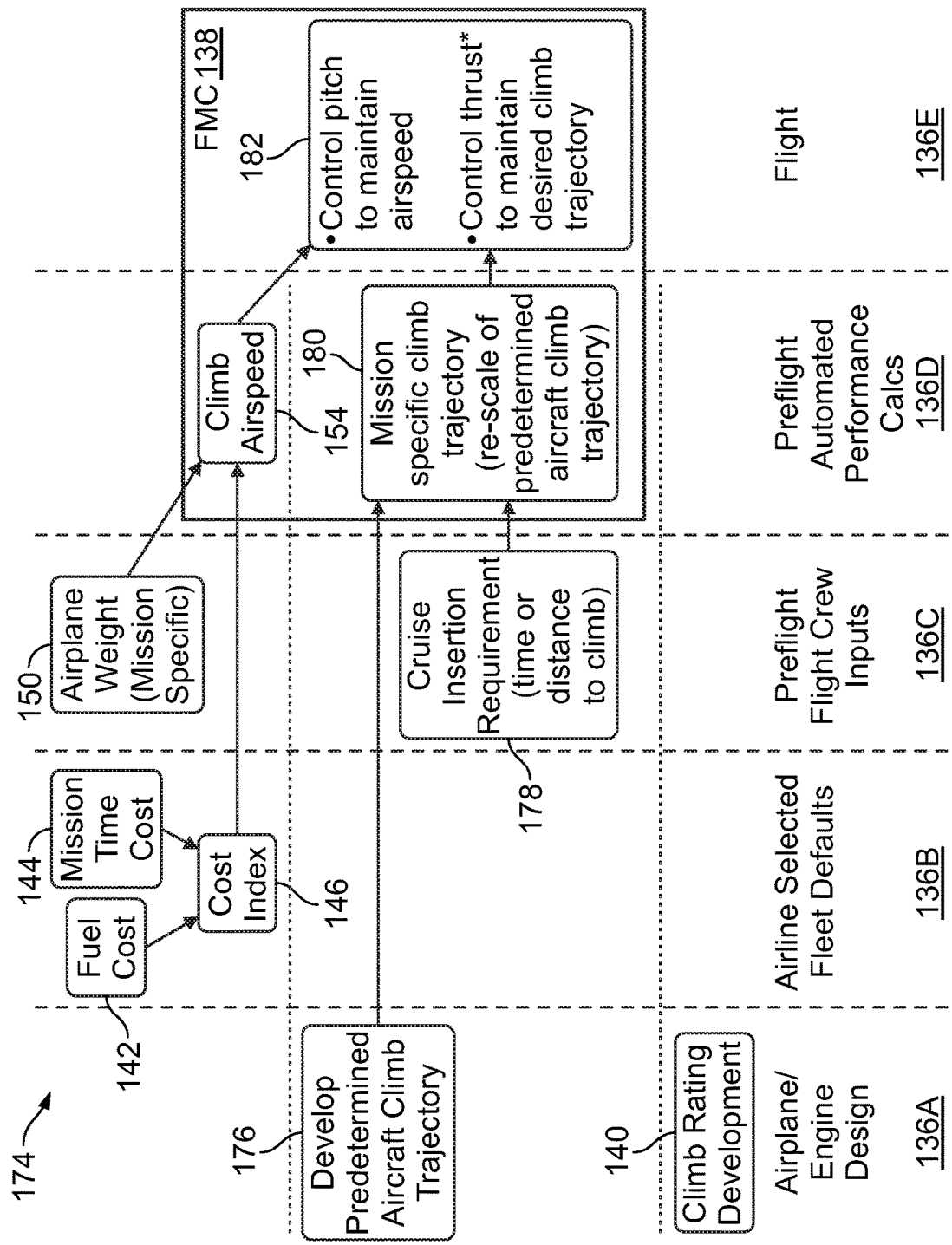
FIG. 8 illustrates another block diagram depicting operations associated with determining a climb profile of an aircraft, in accordance with an example implementation.

FIG. 8 illustrates another block diagram 174 depicting operations associated with determining a climb profile of an aircraft, in accordance with an example implementation. Blocks that are common between the block diagram 134 and the block diagram 174 are referred to using the same reference number. Similar to the block diagram 134, the block diagram is divided into the five columns 136A, 136B, 136C, 136D, and 136E representing respective phases during which blocks included in the column could be executed, performed, or implemented.

As shown in FIG. 8, the blocks 148, 152, and 160 associated with selecting or preconfiguring a derating tapering schedule, a specific or discrete climb thrust derate, and determining a climb thrust schedule are not used. However, other blocks 176, 178, 180, and 182 are added to include operations that render the FMC 138 flexible in determining and varying climb thrust level during the climb flight phase of the aircraft.

At block 176 an aircraft and/or engine manufacturer may develop a predetermined aircraft climb trajectory for the aircraft. In some examples, the predetermined aircraft climb trajectory could also be referred to as an optimum aircraft climb trajectory for the aircraft. The predetermined aircraft climb trajectory is determined for "default" levels of climb performance. For instance, the predetermined aircraft climb trajectory could be determined for a default desired performance that the aircraft takes 180 nm or 30 minutes to reach a particular desired altitude such as 32,000 ft. The predetermined aircraft climb trajectory could be determined as a curve or mapping of altitude versus ground distance or altitude versus time.

Developing the predetermined aircraft climb trajectory may take into account several factors such as airframe and engine performance characteristics. For instance, developing the predetermined aircraft climb trajectory takes into consideration characteristics of the engine of the aircraft being designed to minimize undesirable variations in engine severity during the climb flight phase. Particularly, the predetermined aircraft climb trajectory may be determined to reduce a given temperature within the engine such as TGT or the temperature at any other turbine stage.

Rather than the airline preconfiguring the aircraft with a climb thrust derate taper schedule (the block 148 in FIG. 4) and the flight crew selecting a discrete climb thrust derate (the block 152 in FIG. 4), at block 178 in FIG. 8 the aircraft crew may enter information defining or indicating the desired aircraft cruise insertion point. For instance, the aircraft crew may enter a desired altitude to be reached within a predetermined distance or time period from departure.

As such, the FMC 138 has information indicating the predetermined aircraft climb trajectory (from the block 176) and information indicating the desired aircraft cruise insertion point (from the block 178). Based on this information, at block 180 the FMC 138 determines a modified aircraft climb trajectory for the aircraft. The modified aircraft climb trajectory is mission specific as it takes into consideration the particular desired aircraft cruise insertion point for a particular flight or tail of a flight.

For example, the FMC 138 may re-scale the predetermined aircraft climb trajectory determined at the block 176 based on the desired aircraft cruise insertion point to determine the modified (mission-specific) aircraft climb trajectory. The FMC 138 may re-scale the predetermined aircraft climb trajectory to tailor the climb distance or time to meet the objective of achieving the desired aircraft cruise insertion point. As such, the predetermined aircraft climb trajectory may be considered as a first climb trajectory or an initial climb trajectory that the FMC 138 later modifies or adjusts to a second climb trajectory or a desired climb trajectory that takes into consideration mission-specific parameters and objectives such as the desired aircraft cruise insertion point.

As an example, if the predetermined aircraft climb trajectory is determined as a curve having a particular slope or slopes that vary with altitude or climb distance (e.g., ground distance), the FMC 138 may modify the climb trajectory by modifying the slope(s). As another example, if the predetermined aircraft climb trajectory is determined as a mapping of altitude versus ground distance or altitude versus time, the FMC 138 may modify the climb trajectory by modifying or scaling the mapping. In some examples, however, the FMC 138 may implement the predetermined aircraft climb trajectory without modification or without re-scaling. In other words, in some examples, the FMC 138 might not take the desired aircraft cruise insertion point into consideration, and may thus use the predetermined aircraft climb trajectory.

At block 182, the FMC 138 sends commands to control the elevators (control surfaces) of the aircraft to control the pitch angle of the aircraft and maintain the desired airspeed determined at the block 154. Also, at the block 182, the FMC 138 sends commands to vary climb thrust level of the engine during the climb to maintain the desired or modified aircraft climb trajectory and achieve the desired aircraft cruise insertion point. As mentioned above, the FMC 138 may be in communication with the guidance module and the navigation module of the aircraft. The guidance module may use the generated airspeed and thrust commands in addition to position, velocity, and wind measurements for the aircraft received from the navigation module to generate airspeed and thrust commands. The guidance module may then communicate the airspeed and thrust commands to the AFCS, which in turn controls engine thrust and aerodynamic control surfaces of the aircraft in order to achieve the commands of the guidance module.

As such, the FMC 138 may implement a closed-loop feedback control to adhere to the desired or modified aircraft climb trajectory and achieve the desired aircraft cruise insertion point, rather than implementing a closed-loop feedback control on the airspeed and climb thrust level. This way, the FMC 138 controls the aircraft such that the actual aircraft cruise insertion point is within a threshold error value from the desired aircraft cruise insertion point (e.g., within 1-2% from the ground distance or time-since-departure indicated by the desired aircraft cruise insertion point).

Referring back to FIG. 6, the operations described with respect to the block diagram 174 in FIG. 8 entail the FMC 138 constraining the RoC to a predetermined rate of climb dictated or defined by the modified aircraft climb trajectory or constraining the RoC to track the line 102 shown in FIGS. 1 and 2. The FMC 138 may also constrain the airspeed based on estimated top of climb aircraft weight, cost index line, and altitude. However, the climb thrust level of the aircraft 114 is unconstrained and the FMC 138 is configured to continually adjust the flight path angle of climb $\theta$ and the climb thrust level (T) to adhere to the modified aircraft climb trajectory and achieve the desired aircraft cruise insertion point.

Thus, if excess aircraft performance is detected, the FMC 138 would reduce the climb thrust. For instance, if the FMC 138 determines that the aircraft 114 may reach the cruise altitude earlier, or at a particular ground distance smaller, than indicated by the desired aircraft cruise insertion point, the FMC 138 may reduce the climb thrust.

As such, rather than using discrete climb thrust derates (e.g., CLB1 or CLB2) and a tapering schedule, the climb thrust is allowed to be continually adjusted. Although with this configuration, the climb thrust is allowed to vary continually, the climb thrust does not exceed a maximum rated climb thrust determined by the engine manufacturer. In other words, the climb thrust is allowed to vary to be less than or equal to a maximum rated climb thrust.

With the configuration of FIG. 8, fuel planning for individual missions may be improved. Additionally, due to the ability to reduce climb thrust, engine core temperatures may be reduced by not overexerting the engine or over-achieving the desired aircraft cruise insertion point by arriving earlier than indicated by the desired aircraft cruise insertion point. Thus, engine maintenance cost may be reduced and engine life is enhanced.

Figure 9:
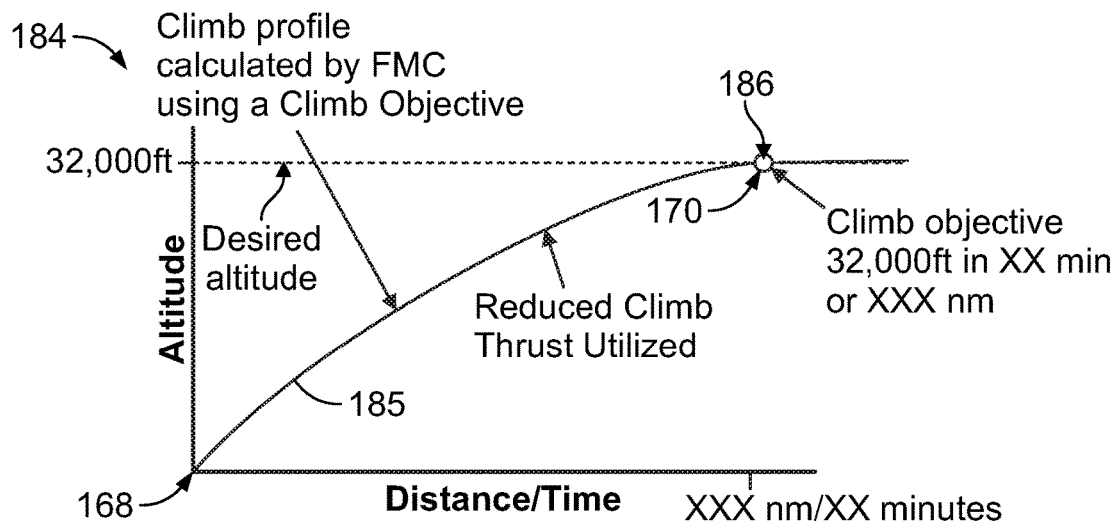
FIG. 9 illustrates a plot of a climb trajectory of an aircraft while implementing the operations of FIG. 8, in accordance with an example implementation.

Further, with the configuration of FIG. 8, variability in the cruise insertion point may be removed or reduced. FIG. 9 illustrates a plot 184 of a climb trajectory 185 of an aircraft while implementing the operations of FIG. 8, in accordance with an example implementation. Similar to FIG. 7, the y-axis indicates altitude of the aircraft in ft, whereas the x-axis indicates distance from departure point 168 or time since leaving the departure point 168.

The operations described with respect to FIG. 8 takes into account the desired aircraft cruise insertion point 170, and the FMC 138 controls the aircraft to achieve the desired aircraft cruise insertion point 170, which may entail reducing climb thrust during the climb flight phase. As such, the climb trajectory 185 is more shallow or gradual than the climb trajectory 167 of FIG. 7, and an actual aircraft cruise insertion point 186 substantially coincides with the desired aircraft cruise insertion point 170. The term "substantially" is used, for example, to indicate that the actual aircraft cruise insertion point 186 coincides with the desired aircraft cruise insertion point 170 or is within a threshold value from the desired aircraft cruise insertion point 170 (e.g., within 1-2% from the ground distance or time-since-departure indicated by the desired aircraft cruise insertion point 170).

Although a first aircraft implementing the operations of FIG. 8 may arrive at a desired altitude later than a second aircraft implementing the operations of FIG. 4, the climb thrust of the first aircraft is reduced compared to the second aircraft. As a result, the first aircraft may have less engine wear, enhanced engine life, and reduced engine maintenance cost compared to the second aircraft, while achieving desired performance by meeting the desired aircraft cruise insertion point 170.

In examples, further enhancement to engine life can be achieved by taking into consideration other parameters such as engine core temperatures and the amount of time that the engine or a particular turbine stage thereof spends operating within a predetermined temperature range during the aircraft climb phase. In examples, engine deterioration could occur most severely when operating within a particular temperature range. Based on the materials used within the engine, that particular temperature range may cause oxidation, corrosion, or breakdown of thermal barrier coatings. It is thus desirable to avoid operating within that particular temperature range or minimizing the amount of time the engine spends operating in that particular temperature range. Taking these parameters (engine core temperature and the duration of operation within a particular range of temperatures) into consideration, the FMC 138 may then allow all three variables (airspeed, climb thrust, and RoC) to change during the climb flight phase.

Figure 10:
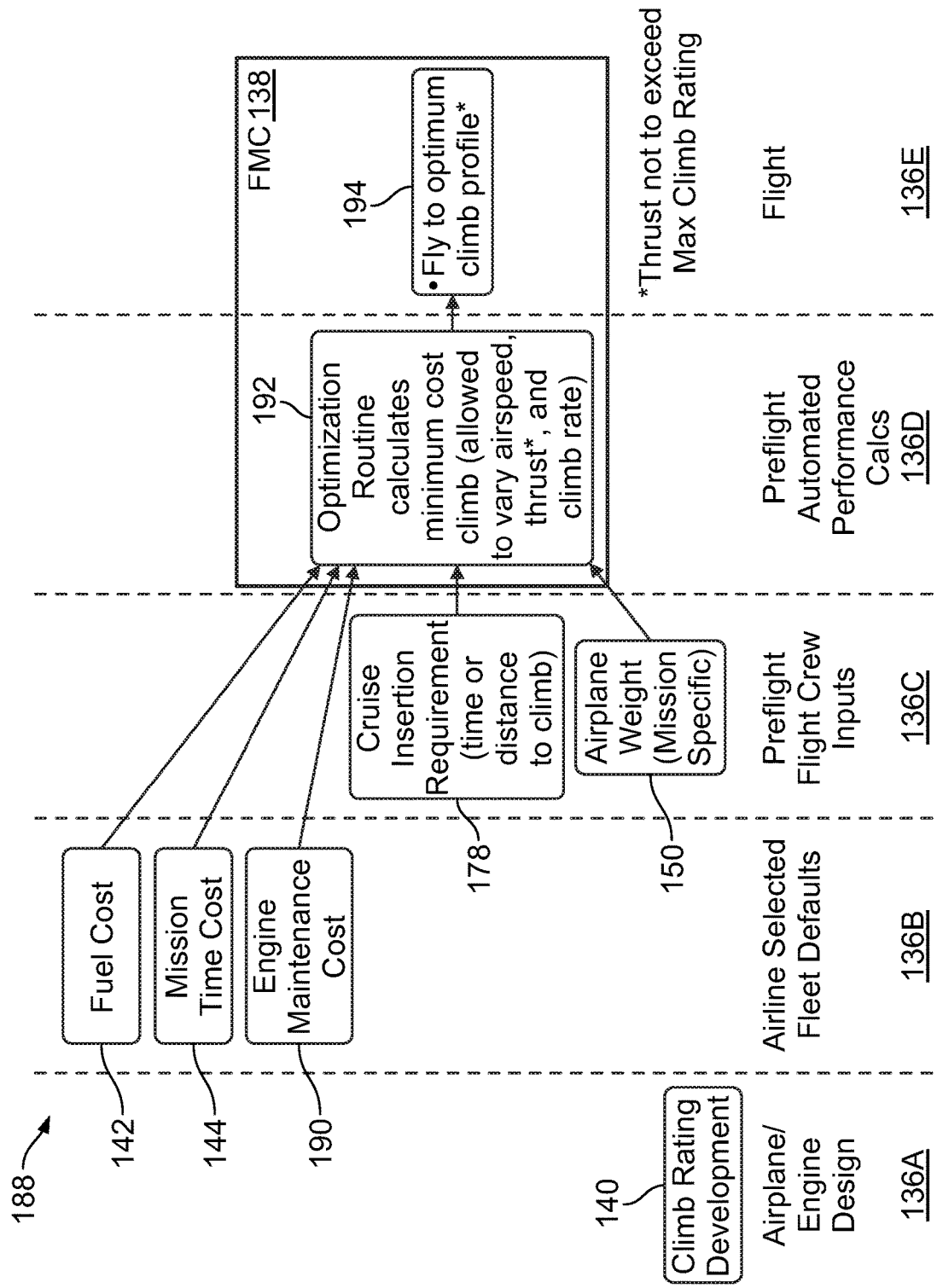
FIG. 10 illustrates another block diagram depicting operations associated with determining a climb profile of an aircraft, in accordance with an example implementation.

FIG. 10 illustrates another block diagram 188 depicting operations associated with determining a climb profile of an aircraft, in accordance with an example implementation. Blocks that are common between the block diagrams 134, 174, and the block diagram 188 are referred to using the same reference number. Similar to the block diagrams 134, 174 the block diagram is divided into the five columns 136A, 136B, 136C, 136D, and 136E representing respective phases during which blocks included in the column could be executed, performed, or implemented.

As shown in FIG. 10, in examples, determining a climb profile for the aircraft might not be based on a predetermined aircraft climb trajectory that is determined for "default" levels of climb performance as described above with respect to the block 176. Further, rather than determining a desired, constrained airspeed based on a cost index line selected by the airline, in the block diagram 188 the airline establishes fuel cost at the block 142, mission time cost at the block 144, and establishes engine maintenance cost at block 190 for a particular aircraft.

As examples, the airline or the aircraft manufacturer may establish fuel cost of the aircraft in dollars per lb of fuel ($/lb). Also, the mission time cost may be established by the airline in dollars per hour of flight ($/hr). Further, at the block 190, the engine manufacturer or the airline may establish engine maintenance cost as a function of a given temperature within the engine. That given temperature may, for example, be TGT, the temperature at the high pressure compressor, the temperature at the high pressure turbine, or any other engine core temperature. For instance, the airline or the engine manufacturer may generate a table or a curve that plots maintenance cost over the life of the engine versus a particular engine temperature (e.g., TGT). Such a table or curve represents an indirect relationship between the climb thrust and the engine maintenance cost because an increased climb thrust may indicate a high engine temperature. Additionally, the engine maintenance cost may be a function of a duration of time that the engine spends operating within a predetermined temperature range.

Information associated with the fuel cost (the block 142), the mission time cost (the block 144), and the engine maintenance cost (the block 190) are provided to the FMC 138 at block 192. At the block 192, the FMC 138 may also receive information from the block 178 indicating the desired aircraft cruise insertion point and information from the block 150 indicating the estimated top of climb weight of the aircraft. Then, at the block 192, the FMC 138 takes into consideration the information from the blocks 142, 144, 19, 178, and 150 and determine, during the climb flight phase: a desired airspeed, a desired climb thrust, and a desired RoC that reduce the overall cost to the airline, while achieving the desired aircraft cruise insertion point.

As an example for illustration, at the block 192, the FMC 138 or any other onboard or off board computing device may implement an optimization routine based on a multi-objective function expressed as a function of airspeed, climb thrust, and RoC. For instance, a first function $f_1$ may express fuel cost as a function of the variables of airspeed (V), climb thrust (T), and RoC; a second function $f_2$ may express mission time cost as a function of the variables V, T, and RoC; a third function $f_3$ may express engine maintenance cost (or a predetermined temperature range at a particular location within the engine or a duration of time that the engine spends operating at the predetermined temperature range) as a function of the variables V, T, and RoC; and a fourth function $f_4$ may express an error or discrepancy between an actual aircraft cruise insertion point and a desired aircraft cruise insertion point as a function of the variables V, T, and RoC.

An optimization problem may thus be set to determine a set of feasible values for V, T, and RoC that minimizes or reduces an multi-objective function that is expressed as a combination of the functions $f_1$, $f_2$, $f_3$, and $f_4$. The feasible values may be constrained to specific ranges. For instance, the airspeed (V) may be constrained to a range of values $V_R$ between a minimum and maximum value that takes into consideration engine characteristics, air density, and top of climb weight of the aircraft (the block 150). Also, the climb thrust (T) may be constrained to a range of thrust values $T_R$ between a minimum that prevents engine stall and a maximum value determined by engine design and characteristics. Similarly, the rate of climb (RoC) may be constrained to a range of RoC values $RoC_R$ between a minimum RoC that could be set by the ATC or airport and a maximum feasible RoC value determined by engine and aircraft performance characteristics.

The optimization problem may thus be expressed as a minimization (min) problem subject to (s.t.) constraints on the values of the variables V, T, and RoC. As an example, the optimization problem can be expresses by the following equation:

$$\min(f_1(V,R,RoC), f_2(V,R,RoC), f_3(V,R,RoC), f_4(V,R,RoC))$$

$$\text{s.t. } V \in V_R$$

$$T \in T_R$$

$$RoC \in RoC_R \qquad (1)$$

Such an optimization (or minimization problem) can be implemented periodically during the climb flight phase, and can be implemented onboard the aircraft (e.g., by the FMC 138) or off-board the aircraft (e.g., by a ground-based computing device or server in communication with the aircraft). As a result of the optimization problem, values for airspeed, climb thrust, and RoC are determined to reduce fuel cost, mission time cost, and engine maintenance cost, while achieving the desired aircraft cruise insertion point.

This mathematical expression is an example for illustration only and other variations could be implemented. For example, an internal temperature of the engine (e.g., TGT or the temperature at another stage within the turbine of the engine) may be set as a constraint such as TGT might not be within a predetermined temperature range. Another constraint may comprise precluding the engine from operating within the predetermined temperature range for a period of time exceeding a predetermined period of time.

As another example, the FMC 138 may continually monitor variation in weight and altitude of the aircraft during the climb flight phase. The FMC 138 may then determine a modified airspeed for the aircraft based on the variation, and vary the climb thrust to achieve the modified airspeed. Other examples are possible.

At block 194, the FMC 138 sends commands to control the elevators (control surfaces) and the engine to achieve the airspeed, climb thrust, and RoC determined at the block 192. As the block 192 determines adjustment to any of the variables (the airspeed, climb thrust, and RoC), the adjustments are communicated to the block 194 and the FMC 138 provides modified commands to the guidance module of the aircraft. As a result, the aircraft climbs toward the cruising altitude while adhering to values of the airspeed, climb thrust, and RoC that may reduce fuel cost, mission time cost, and engine maintenance cost, while achieving the desired aircraft cruise insertion point. With the configuration of FIG. 8, fuel consumption and mission time may be improved, climb thrust may be varied to reduce engine core temperatures, and thus reduce maintenance cost, while achieving the desired aircraft cruise insertion point.

Figure 11:
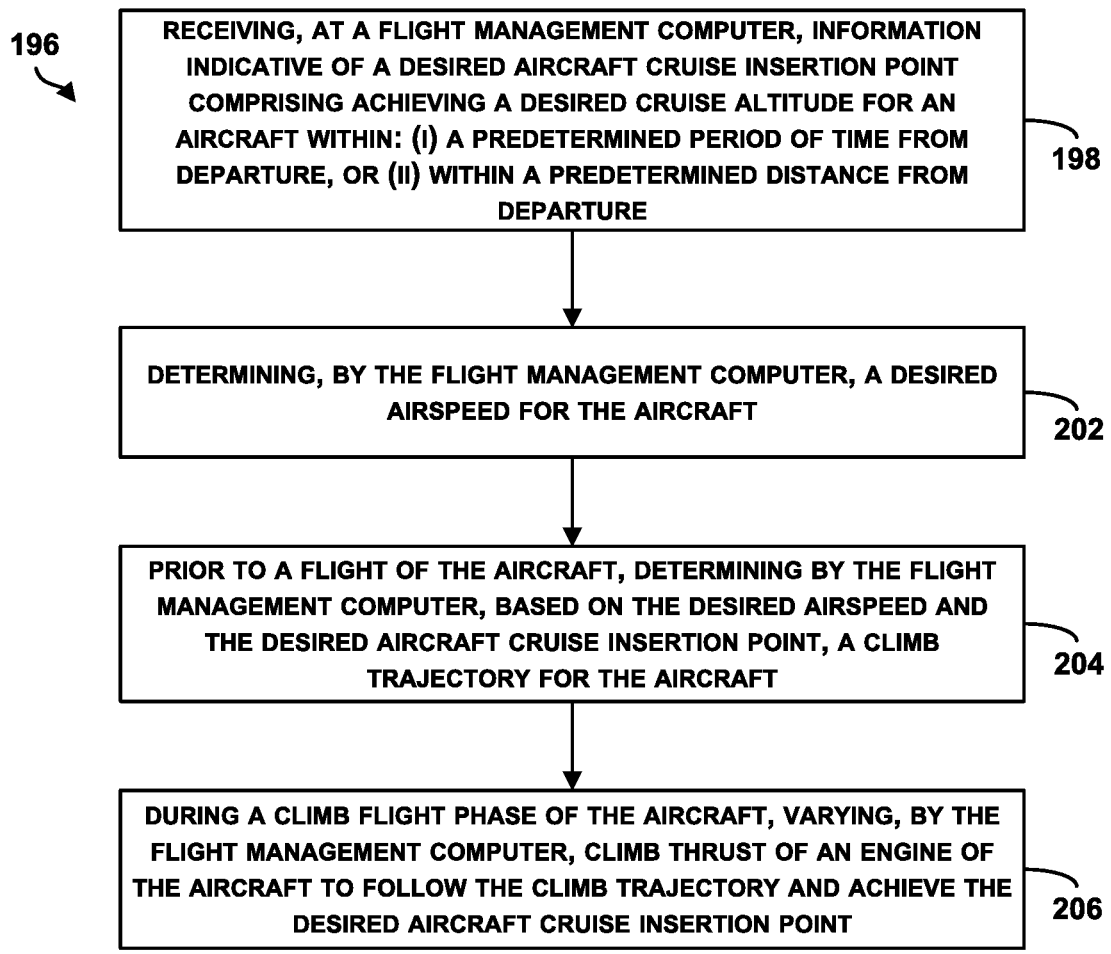
FIG. 11 is a flowchart of a method for varying climb thrust of an aircraft, in accordance with an example implementation.

FIG. 11 is a flowchart of a method 196 for varying climb thrust of an aircraft, in accordance with an example implementation. The method 196 could, for example, be performed by the FMC 138. In another example, other computing devices could be used to implement the method 196 in collaboration with the FMC 138. The computing devices could be airborne and coupled to the aircraft or could be ground-based. The method 196 could, for example, be associated with performing or implementing the operations of any or a combination of the block diagrams 134, 174, and 188. Further, FIGS. 12-16 are flowcharts of methods for use with the method 196.

The method 196 may include one or more operations, or actions as illustrated by one or more of blocks 198-218. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 196 and other processes and operations disclosed herein, the flowchart shows operation of one possible implementation of present examples. In this regard, each block may represent a module, a segment, or a portion of program code, which includes one or more instructions executable by a processor (e.g., a processor or microprocessor of the FMC 138) or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 196 and other processes and operations disclosed herein, one or more blocks in FIGS. 11-16 may represent circuitry or digital logic that is arranged to perform the specific logical operations in the process.

At block 198, the method 196 includes receiving information indicative of a desired aircraft cruise insertion point comprising achieving a desired cruise altitude for an aircraft within: (i) a predetermined period of time from departure, or (ii) within a predetermined distance from departure.

At block 202, the method 196 includes determining a desired airspeed for the aircraft.

Figure 11A:
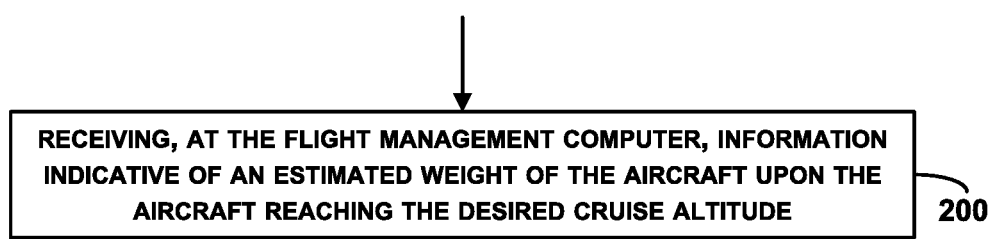
FIG. 11A is a flowchart of an additional operation that may be executed and performed with the method of FIG. 11, in accordance with an example implementation.

FIG. 11A is a flowchart of an additional operation that may be executed and performed with the method 196, in accordance with an example implementation. At block 200, the method 196 may include receiving information indicative of an estimated weight of the aircraft upon the aircraft reaching the desired cruise altitude. The FMC 138 may have access to cost information indicative of: (i) fuel cost, and (ii) mission cost associated with a duration of the flight of the aircraft, and the FMC 138 may determine the desired airspeed for the aircraft based on the cost information and the estimated weight of the aircraft.

At block 204, the method 196 includes prior to a flight of the aircraft, determining, based on the desired airspeed and the desired aircraft cruise insertion point, a climb trajectory for the aircraft.

At block 206, the method 196 includes during a climb flight phase of the aircraft, varying climb thrust of an engine of the aircraft to follow the climb trajectory and achieve the desired aircraft cruise insertion point.

FIG. 12 is a flowchart of additional operations that may be executed and performed with the method 196, in accordance with an example implementation. The FMC 138 has access to information indicative of a predetermined aircraft climb trajectory, and at block 208, operations include modifying the predetermined aircraft climb trajectory based on the information indicative of the desired aircraft cruise insertion point to determine a modified aircraft climb trajectory. Varying the climb thrust of the engine includes varying the climb thrust to follow the modified aircraft climb trajectory and achieve the desired aircraft cruise insertion point.

FIG. 13 is a flowchart of additional operations that may be executed and performed with the method 196, in accordance with an example implementation. At block 210, operations include, while varying the climb thrust of the engine during the climb flight phase, maintaining a rate of climb of the aircraft by sending a command to an elevator flight control surface of the aircraft to adjust a pitch angle of the aircraft during the climb flight phase, thereby maintaining the rate of climb while the climb thrust is varied.

FIG. 14 is a flowchart of additional operations that may be executed and performed with the method 196, in accordance with an example implementation. At blocks 212, 214, operations respectively include monitoring variation in weight and altitude of the aircraft during the climb flight phase; and determining a modified airspeed for the aircraft based on the variation, wherein varying the climb thrust comprises varying the climb thrust of the engine to achieve the modified airspeed.

FIG. 15 is a flowchart of additional operations that may be executed and performed with the method 196, in accordance with an example implementation. At block 216, operations include determining a temperature at a particular turbine stage within the engine. Varying the climb thrust of the engine may include reducing the climb thrust to: (i) preclude the temperature from being within a predetermined temperature range, or (ii) preclude the engine from operating within the predetermined temperature range for a period of time exceeding a predetermined period of time. In an example, the temperature at the particular turbine stage can be determining via a sensor measurement. In another example, the temperature may be determined using a model-based temperature prediction that estimates a temperature of an engine turbine using other parameters such as shaft speed, compressor temperature, etc.).

FIG. 16 is a flowchart of additional operations that may be executed and performed with the method 196, in accordance with an example implementation. The FMC 138 has access to engine maintenance cost information indicating maintenance cost associated with operating the engine at a given temperature within a particular turbine stage of the engine. At block 218, operations include, during the climb flight phase of the aircraft, varying at least one of: (i) airspeed of the aircraft, (ii) the climb thrust of the engine, and (iii) rate of climb of the aircraft based on the cost information (fuel cost and mission cost) and the engine maintenance cost information.

FIG. 17 is a block diagram of the FMC 138, according to an example implementation. The FMC 138 may be used, for example, to perform operations of the flowcharts shown in FIGS. 11-16 and the block diagrams 134, 174, 188 as described herein. The FMC 138 may have processor(s) 220, and also a communication interface 222, data storage 224, an output interface 226, and a display 228 each connected to a communication bus 230. The FMC 138 may also include hardware to enable communication within the FMC 138 and between the FMC 138 and other devices or modules (not shown). The hardware may include transmitters, receivers, and antennas, for example The communication interface 222 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 222 may be configured to receive input data from one or more devices, sensors, or modules, and may also be configured to send output data to other devices or modules (e.g., the guidance module, the navigation module, the AFCS, etc.). The communication interface 222 may also include a user-input device, such as a keyboard or mouse, for example The data storage 224 may include or take the form of one or more computer-readable storage media that can be read or accessed by the processor(s) 220. The computer-readable storage media can include volatile and/or non-volatile storage components, such as optical, magnetic, organic or other memory or disc storage, which can be integrated in whole or in part with the processor(s) 220. The data storage 224 is considered non-transitory computer readable media. In some examples, the data storage 224 can be implemented using a single physical device (e.g., one optical, magnetic, organic or other memory or disc storage unit), while in other examples, the data storage 224 can be implemented using two or more physical devices.

The data storage 224 thus is a non-transitory computer readable storage medium, and executable instructions 232 are stored thereon. The executable instructions 232 include computer executable code. When the executable instructions 232 are executed by the processor(s) 220, the processor(s) 220 are caused to perform operations of the FMC 138 associated with the flowcharts shown in FIGS. 11-16 and the block diagrams 134, 174, 188.

The processor(s) 220 may be a general-purpose processor or a special purpose processor (e.g., digital signal processors, application specific integrated circuits, etc.). The processor(s) 220 may receive inputs from the communication interface 222, and process the inputs to generate outputs that are stored in the data storage 224 and output to the display 228 (e.g., a cockpit display). The processor(s) 220 can be configured to execute the executable instructions 232 (e.g., computer-readable program instructions) that are stored in the data storage 224 and are executable to provide the functionality of the FMC 138 described herein.

The data storage 224 may store the information indicative of the predetermined aircraft climb trajectory. The data storage 224 may also store the information associated with engine maintenance cost, mission cost, fuel cost, cost index lines, etc. Such information may be predetermined or known, and pre-stored on the FMC 138, or can be determined, received, or updated periodically or continually via other computing devices or modules.

The output interface 226 outputs information to the display 228 or to other components as well. Thus, the output interface 226 may be similar to the communication interface 222 and can be a wireless interface (e.g., transmitter) or a wired interface as well.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method comprising:
receiving, at a flight management computer, information indicative of a desired aircraft cruise insertion point comprising achieving a desired cruise altitude for an aircraft within: (i) a predetermined period of time from departure, or (ii) within a predetermined distance from departure;
determining, by the flight management computer, a desired airspeed for the aircraft;
prior to a flight of the aircraft, determining, by the flight management computer, based on the desired airspeed and the desired aircraft cruise insertion point, a climb trajectory for the aircraft; and
during a climb flight phase of the aircraft, varying, by the flight management computer, climb thrust of an engine of the aircraft to follow the climb trajectory and achieve the desired aircraft cruise insertion point.

2. The method of claim 1, wherein the flight management computer has access to information indicative of a predetermined aircraft climb trajectory, wherein determining the climb trajectory comprises:
modifying the predetermined aircraft climb trajectory based on the information indicative of the desired aircraft cruise insertion point to determine a modified aircraft climb trajectory, wherein varying the climb thrust of the engine comprises varying the climb thrust to follow the modified aircraft climb trajectory and achieve the desired aircraft cruise insertion point.

3. The method of claim 1, further comprising:
while varying the climb thrust of the engine during the climb flight phase:
maintaining a rate of climb of the aircraft by sending a command to an elevator flight control surface of the aircraft to adjust a pitch angle of the aircraft during the climb flight phase, thereby maintaining the rate of climb while the climb thrust is varied.

4. The method of claim 1, further comprising:
determining a temperature at a particular turbine stage within the engine, wherein varying the climb thrust of the engine comprises adjusting the climb thrust to: (i) preclude the temperature from being within a predetermined temperature range, or (ii) preclude the engine from operating within the predetermined temperature range for a period of time exceeding a predetermined period of time.

5. The method of claim 1, wherein the flight management computer has access to cost information indicative of: (i) fuel cost, and (ii) mission cost associated with a duration of the flight of the aircraft, wherein determining the desired airspeed for the aircraft is further based on the cost information.

6. The method of claim 5, wherein the flight management computer has access to engine maintenance cost information indicating maintenance cost associated with operating the engine at a given temperature within a particular turbine stage of the engine, the method further comprising:
during the climb flight phase of the aircraft, varying at least one of: (i) airspeed of the aircraft, (ii) the climb thrust of the engine, and (iii) rate of climb of the aircraft based on the cost information and the engine maintenance cost information.

7. A non-transitory computer readable medium having stored therein instructions that, in response to execution by a flight management computer, cause the flight management computer to perform operations comprising:
receiving information indicative of a desired aircraft cruise insertion point comprising achieving a desired cruise altitude for an aircraft: (i) within a predetermined period of time from departure, or (ii) within a predetermined distance from departure;
determining a desired airspeed for the aircraft;
prior to a flight of the aircraft, determining, based on the desired airspeed and the desired aircraft cruise insertion point, a climb trajectory for the aircraft; and during a climb flight phase of the aircraft, varying climb thrust of an engine of the aircraft to follow the climb trajectory and achieve the desired aircraft cruise insertion point.

8. The non-transitory computer readable medium of claim 7, wherein the flight management computer has access to information indicative of a predetermined aircraft climb trajectory, wherein determining the climb trajectory comprises:
   modifying the predetermined aircraft climb trajectory based on the information indicative of the desired aircraft cruise insertion point to determine a modified aircraft climb trajectory, wherein varying the climb thrust of the engine comprises varying the climb thrust to follow the modified aircraft climb trajectory and achieve the desired aircraft cruise insertion point.

9. The non-transitory computer readable medium of claim 7, wherein the operations further comprise:
   while varying the climb thrust of the engine during the climb flight phase:
      maintaining a rate of climb of the aircraft by sending a command to an elevator flight control surface of the aircraft to adjust a pitch angle of the aircraft during the climb flight phase, thereby maintaining the rate of climb while the climb thrust is varied.

10. The non-transitory computer readable medium of claim 7, wherein the operations further comprise:
   determining a temperature at a particular turbine stage within the engine, wherein varying the climb thrust of the engine comprises adjusting the climb thrust to: (i) preclude the temperature from being within a predetermined temperature range, or (ii) preclude the engine from operating within the predetermined temperature range for a period of time exceeding a predetermined period of time.

11. The non-transitory computer readable medium of claim 7, wherein the flight management computer has access to cost information indicative of: (i) fuel cost, and (ii) mission cost associated with a duration of the flight of the aircraft, wherein determining the desired airspeed for the aircraft is further based on the cost information.

12. The non-transitory computer readable medium of claim 11, wherein the flight management computer has access to engine maintenance cost information indicating maintenance cost associated with operating the engine at a given temperature within a particular turbine stage of the engine, and wherein the operations further comprise:
   during the climb flight phase of the aircraft, varying at least one of: (i) airspeed of the aircraft, (ii) the climb thrust of the engine, and (iii) rate of climb of the aircraft based on the cost information and the engine maintenance cost information.

13. A flight management computer comprising:
   one or more processors; and
   data storage storing thereon instructions, that when executed by the one or more processors, cause the flight management computer to perform operations comprising:
      receiving information indicative of a desired aircraft cruise insertion point comprising achieving a desired cruise altitude for an aircraft: (i) within a predetermined period of time from departure, or (ii) within a predetermined distance from departure;
      determining a desired airspeed for the aircraft;
      prior to a flight of the aircraft, determining, based on the desired airspeed and the desired aircraft cruise insertion point, a climb trajectory for the aircraft; and
      during a climb flight phase of the aircraft, varying climb thrust of an engine of the aircraft to follow the climb trajectory and achieve the desired aircraft cruise insertion point.

14. The flight management computer of claim 13, wherein the flight management computer has access to information indicative of a predetermined aircraft climb trajectory, wherein determining the climb trajectory comprises:
   modifying the predetermined aircraft climb trajectory based on the information indicative of the desired aircraft cruise insertion point to determine a modified aircraft climb trajectory, wherein varying the climb thrust of the engine comprises varying the climb thrust to follow the modified aircraft climb trajectory and achieve the desired aircraft cruise insertion point.

15. The flight management computer of claim 13, wherein the operations further comprise:
   while varying the climb thrust of the engine during the climb flight phase:
      maintaining a rate of climb of the aircraft by sending a command to an elevator flight control surface of the aircraft to adjust a pitch angle of the aircraft during the climb flight phase, thereby maintaining the rate of climb while the climb thrust is varied.

16. The flight management computer of claim 13, wherein the operations further comprise:
   determining a temperature at a particular turbine stage within the engine, wherein varying the climb thrust of the engine comprises adjusting the climb thrust to: (i) preclude the temperature from being within a predetermined temperature range, or (ii) preclude the engine from operating within the predetermined temperature range for a period of time exceeding a predetermined period of time.

17. The flight management computer of claim 13, wherein the flight management computer has access to cost information indicative of: (i) fuel cost, (ii) mission cost associated with a duration of the flight of the aircraft, and (iii) engine maintenance cost indicating maintenance cost associated with operating the engine at a given temperature within a particular turbine stage of the engine, and wherein the operations further comprise:
   during the climb flight phase of the aircraft, varying at least one of: (i) airspeed of the aircraft, (ii) the climb thrust of the engine, and (iii) rate of climb of the aircraft based on the cost information.

* * * * *